(12) United States Patent
Chen

(10) Patent No.: US 7,801,680 B2
(45) Date of Patent: Sep. 21, 2010

(54) POSITIONING SYSTEM FOR A MOVABLE OBJECT

(76) Inventor: Mao-Jung Chen, No. 43, Ting-Keng, Hsia-Keng Tsun, Fan-Lu Hsiang, Chiayi Hsien (TW)

( * ) Notice: Subject to any disclaimer, the term of this patent is extended or adjusted under 35 U.S.C. 154(b) by 455 days.

(21) Appl. No.: 12/002,632

(22) Filed: Dec. 18, 2007

(65) Prior Publication Data

US 2008/0306688 A1    Dec. 11, 2008

(30) Foreign Application Priority Data

Jun. 11, 2007    (TW) .............................. 96120991 A

(51) Int. Cl.
*G01C 21/00* (2006.01)
(52) U.S. Cl. .................. 701/213; 701/300; 340/539.13; 342/357.06; 342/357.09; 342/357.1
(58) Field of Classification Search ................ 701/207, 701/213, 300, 2; 342/357.01, 357.06, 357.09, 342/357.1; 340/426.1, 426.24, 539.13, 539.26
See application file for complete search history.

(56) References Cited

U.S. PATENT DOCUMENTS 6,198,390 B1 *   3/2001   Schlager et al. ............. 340/540
6,259,399 B1 *   7/2001   Krasner ................. 342/357.06
7,212,134 B2 *   5/2007   Taylor ........................ 340/901

FOREIGN PATENT DOCUMENTS

TW          413366 Y     11/2000
TW          246481 B      1/2006

* cited by examiner

*Primary Examiner*—Gertrude Arthur Jeanglaud
(74) *Attorney, Agent, or Firm*—Ohlandt, Greeley, Ruggiero & Perle, LLP

(57) ABSTRACT

A positioning terminal is disposed on a movable object, and includes a satellite-based positioning module, a detecting module, a processing module, and a wireless communication module. The positioning module receives satellite-transmitted signals and generates positioning data therefrom. The detecting module detects status of the movable object, and generates an alarm signal when an abnormal status is detected. The processing module includes a storage medium for storing the positioning data from the positioning module, and a processing unit for processing the positioning data stored in the storage medium and for outputting geographical information of the movable object. The processing unit further outputs alarm information based on the alarm signal. The wireless communication module is used to transmit the geographical information and the alarm information from the processing module.

16 Claims, 5 Drawing Sheets

POSITIONING SYSTEM FOR A MOVABLE OBJECT

BACKGROUND OF THE INVENTION

1. Field of the Invention

The invention relates to a positioning system, more particularly to a positioning system for a movable object.

2. Description of the Related Art

At present, some vehicle security systems, such as those disclosed in R.O.C. Patent Publication No. 413366 and R.O.C. Patent No. I246481, are integrated with satellite-based positioning systems so that vehicle owners are able to monitor the location of their vehicles at any time. Such vehicle security systems include a server, and a positioning terminal disposed on a vehicle and capable of receiving satellite-transmitted signals and detecting status of the vehicle. The satellite-transmitted signals are decoded to result in positioning data (i.e., coordinate data) sent to the server. In addition, when an abnormal status of the vehicle is detected, such as when an intruder is detected or when the vehicle is towed, the server is able to notify the vehicle owner immediately by telephone so that the vehicle owner may act accordingly.

However, the aforementioned vehicle security systems require storage of detailed information and contact data of vehicle owners in the server. Hence, if the server is hacked, the detailed information and contact data of the vehicle owners can be stolen, and the locations of their vehicles will be revealed to the hacker. As a result, privacy and security of confidential information are not ensured.

SUMMARY OF THE INVENTION

Therefore, the object of the present invention is to provide a positioning system capable of monitoring the location of a movable object while ensuring privacy and security of information.

Accordingly, the positioning system of this invention comprises a positioning terminal adapted to be disposed on a movable object. The positioning terminal includes a satellite-based positioning module, a detecting module, a processing module; and a first wireless communication module.

The satellite-based positioning module is adapted to receive satellite-transmitted signals and to generate positioning data from the satellite-transmitted signals.

The detecting module is adapted to detect status of the movable object, and is operable to generate an alarm signal when the detecting module detects an abnormal status of the movable object.

The processing module is coupled to the satellite-based positioning module and the detecting module, and includes a storage medium for storing the positioning data from the satellite-based positioning module, and a processing unit for processing the positioning data stored in the storage medium and for outputting geographical information that contains geographical location of the movable object. The processing unit further outputs alarm information based on the alarm signal received from the detecting module.

The first wireless communication module is coupled to the processing module, and is operable to wirelessly transmit the geographical information and the alarm information from the processing module.

The first wireless communication module is further operable to receive a control signal that is provided to the processing module. The processing module selectively activates the satellite-based positioning module to update the positioning data and selectively enables and disables operation of the detecting module according to the control signal received thereby.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
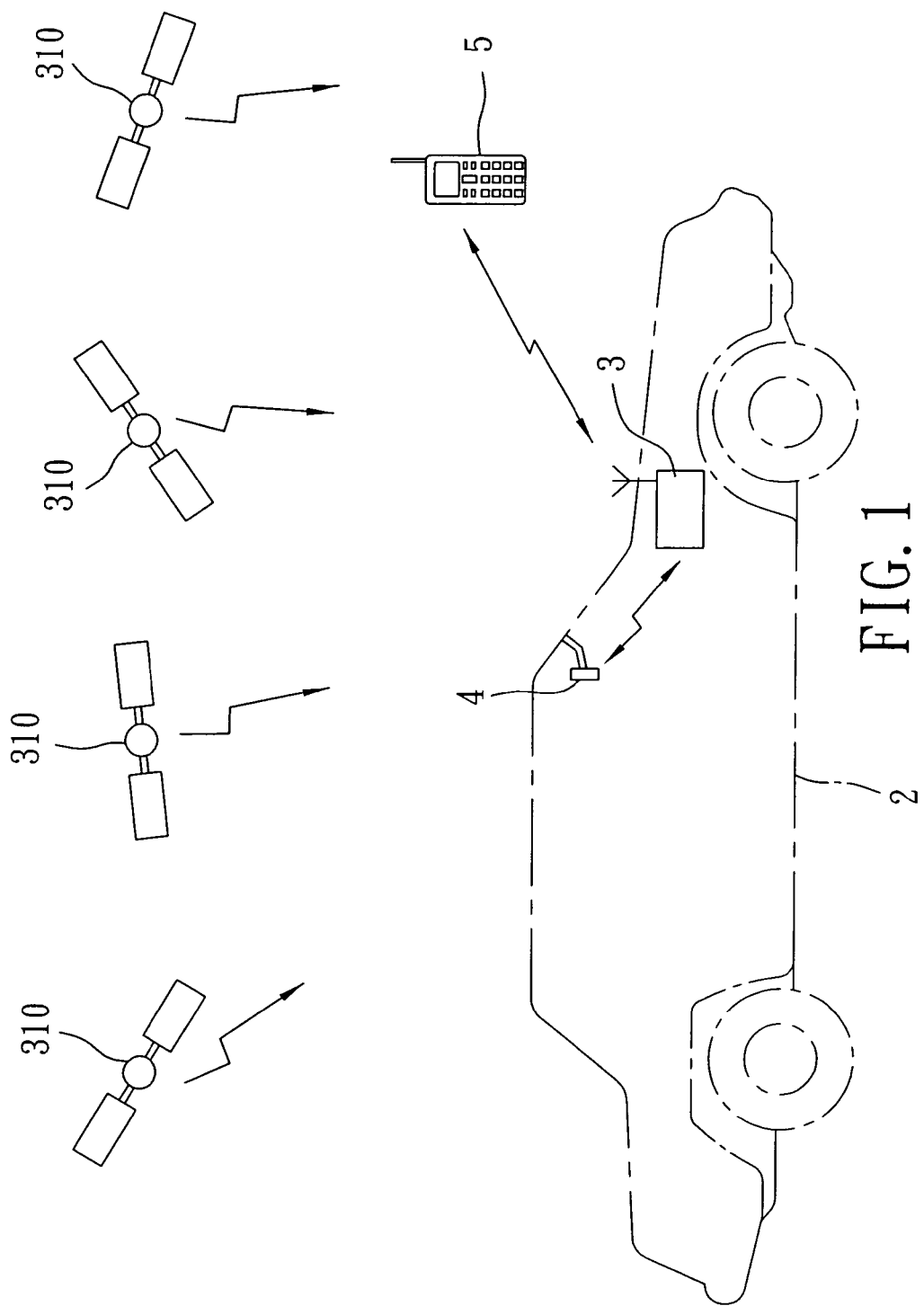
FIG. 1 is a schematic diagram of the first preferred embodiment of a positioning system for a movable object according to the present invention.

Before the present invention is described in greater detail with reference to the accompanying preferred embodiments, it should be noted herein that like elements are denoted by the same reference numerals throughout the disclosure.

Figure 2:
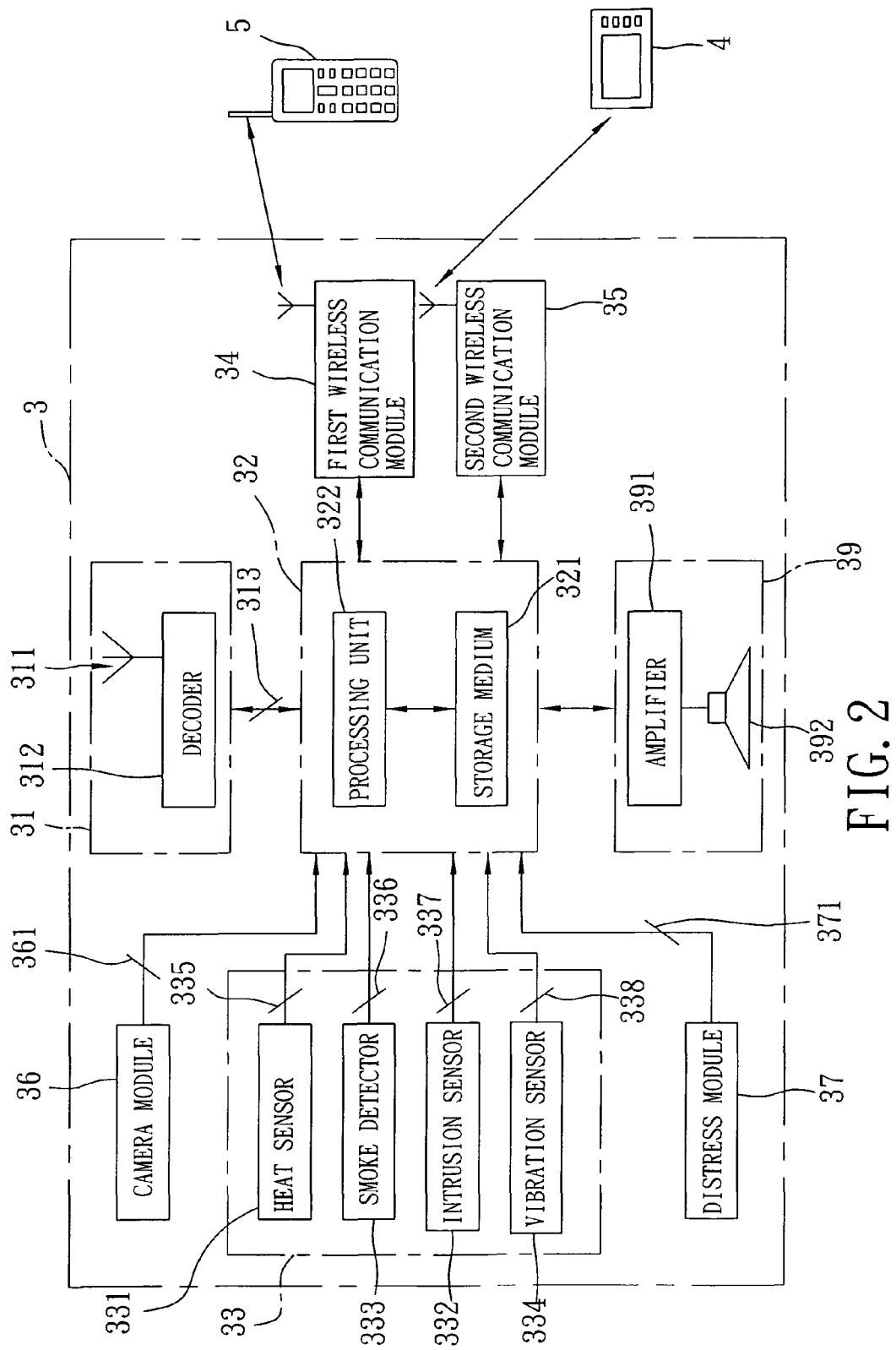
FIG. 2 is a block diagram to illustrate components of a positioning terminal of the first preferred embodiment in greater detail.
Figure 3:
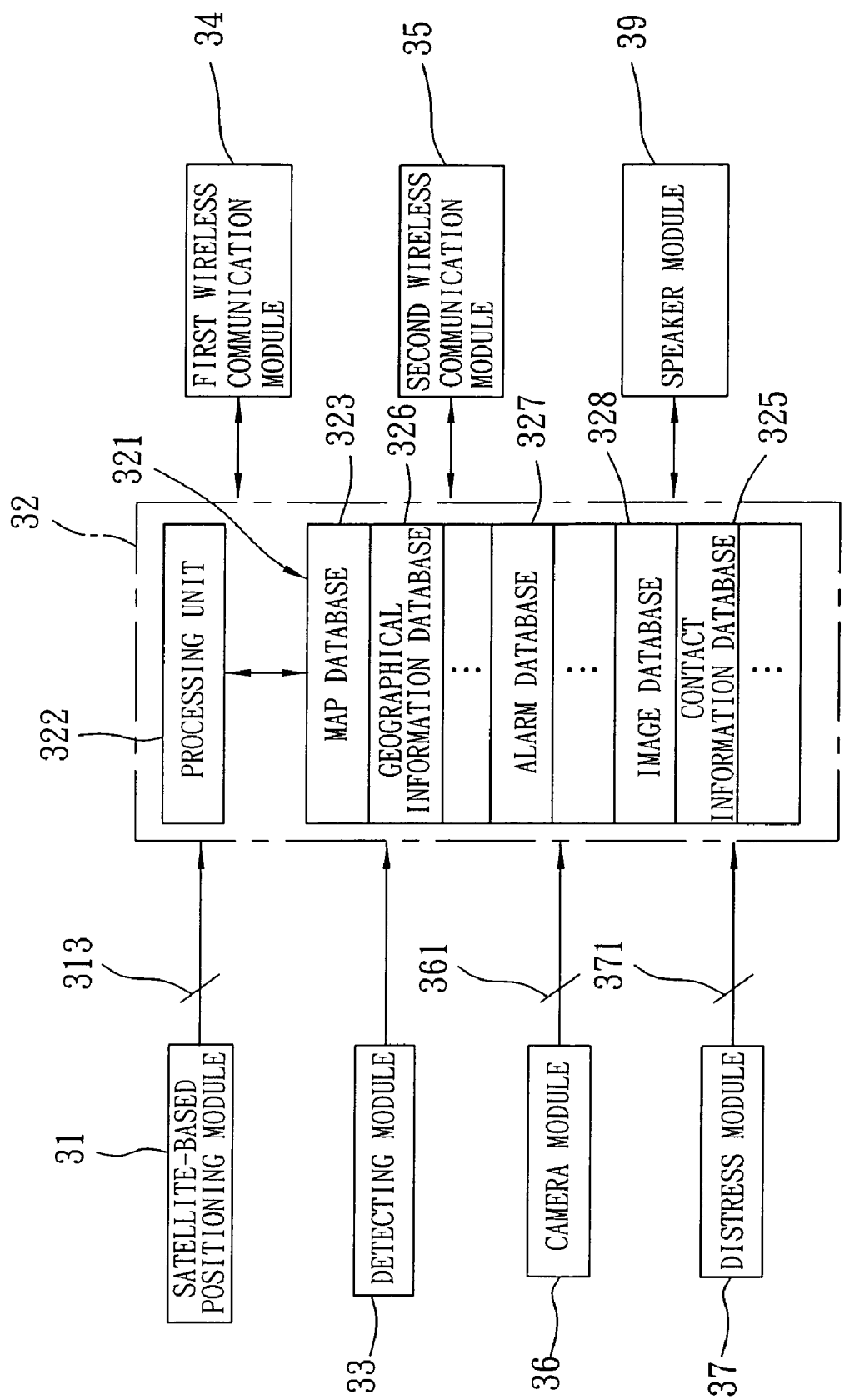
FIG. 3 is another block diagram of the positioning terminal of the first preferred embodiment to illustrate a processing module thereof in greater detail.

Referring to FIGS. 1 to 3, the first preferred embodiment of a positioning system according to the present invention is shown to be adapted for application to a movable object 2. The positioning system includes a positioning terminal 3 that is adapted to be disposed on the movable object 2, a display terminal 4 that is adapted to be disposed on the movable object 2 for displaying information obtained from the positioning terminal 3, and a user terminal 5 operated by a user. In this embodiment, the display terminal 4 is a personal digital assistant (PDA), and the user terminal 5 is a mobile phone. Moreover, the movable object 2 may be any transport vehicle, such as a car, or cargo that is being transported.

The positioning terminal 3 includes a satellite-based positioning module 31, a processing module 32, a detecting module 33, a first wireless communication module 34, a second wireless communication module 35, a camera module 36, a distress module 37, and a speaker module 39.

The satellite-based positioning module 31 includes a receiving antenna 311 for receiving signals transmitted by a plurality of satellites 310, and a decoder 312 coupled to the receiving antenna 311 for decoding the satellite-transmitted signals to generate positioning data 313 (i.e., coordinate data of the location of the movable object 2).

The processing module 32 is coupled to the satellite-based positioning module 31, and includes a storage medium 321 for storing the positioning data 313 from the satellite-based positioning module 31, and a processing unit 322 for processing the positioning data 313 stored in the storage medium 321 and for outputting geographical information that contains geographical location of the movable object 2. In this embodiment, the storage medium 321 of the processing module 32 includes a map database 323 for storing map data, a contact information database 325 for storing emergency contact information, a geographical information database 326, an alarm database 327, and an image database 328. In this embodiment, the processing unit 322 outputs the geographical information with reference to the positioning data 313 stored in the storage medium 321 and the map data in the map data base 323. In particular, the processing unit 322 compares the positioning data 313 in the storage medium 321 with the map data in the map database 323 to obtain the geographical location of the movable object 2. The processing unit 322 then retrieves files corresponding to the geographical location from the geographical information database 326 to result in the geographical information that is subsequently outputted by the processing unit 322. In this embodiment, the geographical information database 326 includes voice files of various geographical locations, i.e., area names, street names, etc. Nevertheless, in other embodiments, the geographical information database 326 may store only text files of the various geographical locations, or both text and voice files of the various geographical locations. Hence, the actual format of the geographical information should not be limited to what is disclosed herein. In addition, since the feature of the present invention does not reside in the specifics of how the processing unit 322 compares the positioning data 313 in the storage medium 321 with the map data in the map database 323 to obtain the geographical location of the movable object 2, further details of the same are omitted herein for the sake of brevity.

The detecting module 33 is coupled to the processing module 32, is adapted to detect status of the movable object 2, and is operable to generate an alarm signal when the detecting module 33 detects an abnormal status of the movable object 2. In response to the alarm signal received from the detecting module 33, the processing unit 322 retrieves corresponding alarm information from the alarm database 327 in the storage medium 321 that is subsequently outputted by the processing unit 322. In this embodiment, the detecting module 33 includes a heat sensor 331 for sensing ambient temperature of the movable object 2, an intrusion sensor 332 for detecting unauthorized entry into the movable object 2, a smoke detector 333 for detecting smoke in the movable object 2, and a vibration sensor 334 for detecting movement of the movable object 2. However, it should be apparent to those skilled in the art that the actual number and types of sensors/detectors that constitute the detecting module 33 can vary in other embodiments of the present invention.

The heat sensor 331 generates a high temperature alarm signal 335 when a temperature detected thereby is higher than a predetermined threshold. The smoke detector 333 generates a smoke detection alarm signal 336 in response to detection of smoke in the movable object 2. Upon receipt of the high temperature alarm signal 335 and the smoke detection alarm signal 336, the processing unit 322 is able to determine occurrence of a fire, and outputs the alarm information from the alarm database 327 that contains corresponding voice or text messages.

The intrusion sensor 332 generates an intrusion alarm signal 337 upon detection of unauthorized entry into the movable object 2. In this embodiment, the intrusion sensor 332 is an infrared sensor. The vibration sensor 334 generates a vibration detection alarm signal 338 upon detection of vibrations resulting from movement of the movable object 2. Upon receipt of the intrusion alarm signal 337 and the vibration detection alarm signal 338, the processing unit 322 is able to determine whether the movable object 2 is being intruded, towed or stolen, and outputs the alarm information from the alarm database 327 that contains corresponding voice or text messages. Since the feature of the present invention does not reside in the structures of the heat sensor 331, the intrusion sensor 332, the smoke detector 333, and the vibration sensor 334, further details of the same are omitted herein for the sake of brevity.

The first wireless communication module 34 is coupled to the processing module 32, and is operable to wirelessly transmit the geographical information and the alarm information from the processing module 32. In this embodiment, the first wireless communication module 34 is a communication module, such as a GPRS, GSM or PHS transceiver device, commonly found in mobile phones. Therefore, the first wireless communication module 34 has functions of a mobile phone so as to be able to establish a direct wireless connection with the user terminal 5, thereby enabling the user terminal 5 to receive the voice or text messages of the geographical information and the alarm information outputted by the processing module 32, and thereby enabling the processing module 32 to receive messages for storage in the storage medium 321.

The second wireless communication module 35 is coupled to the processing module 32, and is operable to establish a wireless connection with the display terminal 4. The processing module 32 is operable to transmit the geographical information to the display terminal 4 via the second wireless communication module 35. The display terminal 4 displays an image of the geographical location of the movable object 2 in response to the geographical information received from the positioning terminal 3. Preferably, the second wireless communication module 35 transmits a low power signal compared to that transmitted by the first wireless communication module 34. While the second wireless communication module 35 is exemplified using a Bluetooth transceiver in this embodiment, the particular type of the second wireless communication module 35 is not limited thereto in other embodiments of this invention.

The camera module 36 is coupled to the processing module 32 and is set up to capture ambient images of the movable object 2 (e.g., inside or outside the movable object 2) and to generate corresponding image data 361 provided to the processing module 32 for storage in the image database 328 of the storage medium 321 of the processing module 32. Accordingly, the processing module 32 is further operable to transmit the image data 328 to the user terminal 5 via the first wireless communication module 34. Moreover, the image data 361 of the image database 328 is also provided by the processing module 32 to the display terminal 4 through the second wireless communication module 35 to assist a driver of the movable object 2 when, for example, the movable object 2 is parked to avoid collision due to blind spots.

The distress module 37 is coupled to the processing module 32 and is provided with an emergency button (not shown) that can be operated in case of an emergency, such as when the driver of the movable object 2 experiences discomfort, is being robbed or is involved in a car accident, so as to enable the distress module 37 to generate a distress signal 371. In response to the distress signal 371, the processing unit 322 retrieves the emergency contact information stored in the contact information database 325 of the storage medium 321, and transmits the geographical information and distress information to a relevant party via the first wireless communication module 34 according to the emergency contact information.

The speaker module 39 includes an amplifier 391 coupled to the processing module 32, and a speaker 392 coupled to the amplifier 391. The processing unit 322 can be configured such that the speaker module 39 generates a voice output corresponding to the geographical information either periodically or upon receipt of a user command. As a result, the driver of the movable object 2 need not look at the display terminal 4 to obtain information of the geographical location of the movable object 2.

The various modes of operation of the positioning system of this embodiment will now be described in the following paragraphs.

After leaving the movable object 2, the user first operates the user terminal 5 to establish a wireless connection with the first wireless communication module 34 and, after password confirmation, to send a control signal that is received by the first wireless communication module 34 via the wireless connection established with the user terminal 5 and that is provided to the processing module 32. In response to the control signal, the processing unit 322 of the processing module 32 activates the satellite-based positioning module 31 such that the signals received by the receiving antenna 311 from the satellites 310 are decoded by the decoder 312 into the positioning data 313 provided to the processing module 32, and further enables operation of the detecting module 33. The processing unit 322 compares the positioning data 313 with the map data in the map database 323 to obtain the geographical location of the movable object 2, and further retrieves the corresponding voice files from the geographical information database 326 for subsequent transmission to the user terminal 5 via the first wireless communication module 34. As a result, the user is able to monitor the current location of the movable object 2. Since information of the geographical location is presented in a voice format, the user terminal 5 may also be a conventional landline telephone or a 2G mobile phone. Settings of the positioning terminal 3 can be reconfigured through the user terminal 5 after password confirmation, so that information from the positioning terminal 3 can be transmitted to other user terminals 5. Since comparison of the positioning data 313 with the map data in the map database 323 and output of the geographical information in voice format are techniques commonly found in satellite-based positioning systems, further details of the same are omitted herein for the sake of brevity.

Meanwhile, when the detecting module 33 detects an abnormal status of the movable object 2, such as when there is a fire or an intruder, or when the movable object 2 is being towed or stolen, the detecting module 33 generates the corresponding alarm signal, and the processing unit 322 responds to the alarm signal by retrieving the corresponding alarm information from the alarm database 327 that is subsequently transmitted to the user terminal 5 via the first wireless communication module 34. Moreover, the camera module 36 permits the user to view ambient images of the moving object 2 through the user terminal 5.

In another mode of operation, the positioning terminal 3 is configured to periodically transmit information to the user terminal 5. The user can configure the processing module 32 to activate the satellite-based positioning module 31 periodically and to report the geographical information to the user terminal 5 or to store the geographical information in a voice mailbox of the user terminal 5 at regular intervals, thereby enabling the user to track the location of the movable object 2. This mode of operation is suitable for a cargo delivery company or a taxi operator, and permits regular monitoring of locations of company vehicles.

In yet another mode of operation, when the user is inside the movable object 2, and the display terminal 4 is disposed in the movable object 2, the processing module 32 can be operated to transmit the geographical information to the display terminal 4 via the second wireless communication module 35, so that the display terminal 4 can display an image of the current geographical location of the movable object 2 in response to the geographical information received from the positioning terminal 3. Furthermore, the speaker module 39 may be activated to generate a voice output corresponding to the geographical information so that information of the geographical location may be provided to the user without requiring the user to look at the display terminal 4. Moreover, the image data 361 stored in the image database 328 may be provided by the processing module 32 to the display terminal 4 through the second wireless communication module 35 so as to assist the user when, for example, parking the movable object 2 to avoid collision. In addition, in case of an emergency, the distress module 37 may be operated to generate a distress signal so that, in response to the distress signal, the processing module 32 transmits the geographical information and distress information via the first wireless communication module 34 according to the emergency contact information stored in the contact information database 325. As a result, the relevant party, upon receiving the transmitted information, can come to the rescue of the user.

In the positioning system of this invention, information exchange between the positioning terminal 3 and the user terminal 5 does not require storage of private information in a service spot. Hence, leakage of private information can be avoided. Moreover, since information of the location of the movable object 2 is transmitted to the user terminal 5, exposure of the location of the movable object 2 to others can be avoided.

Figure 4:
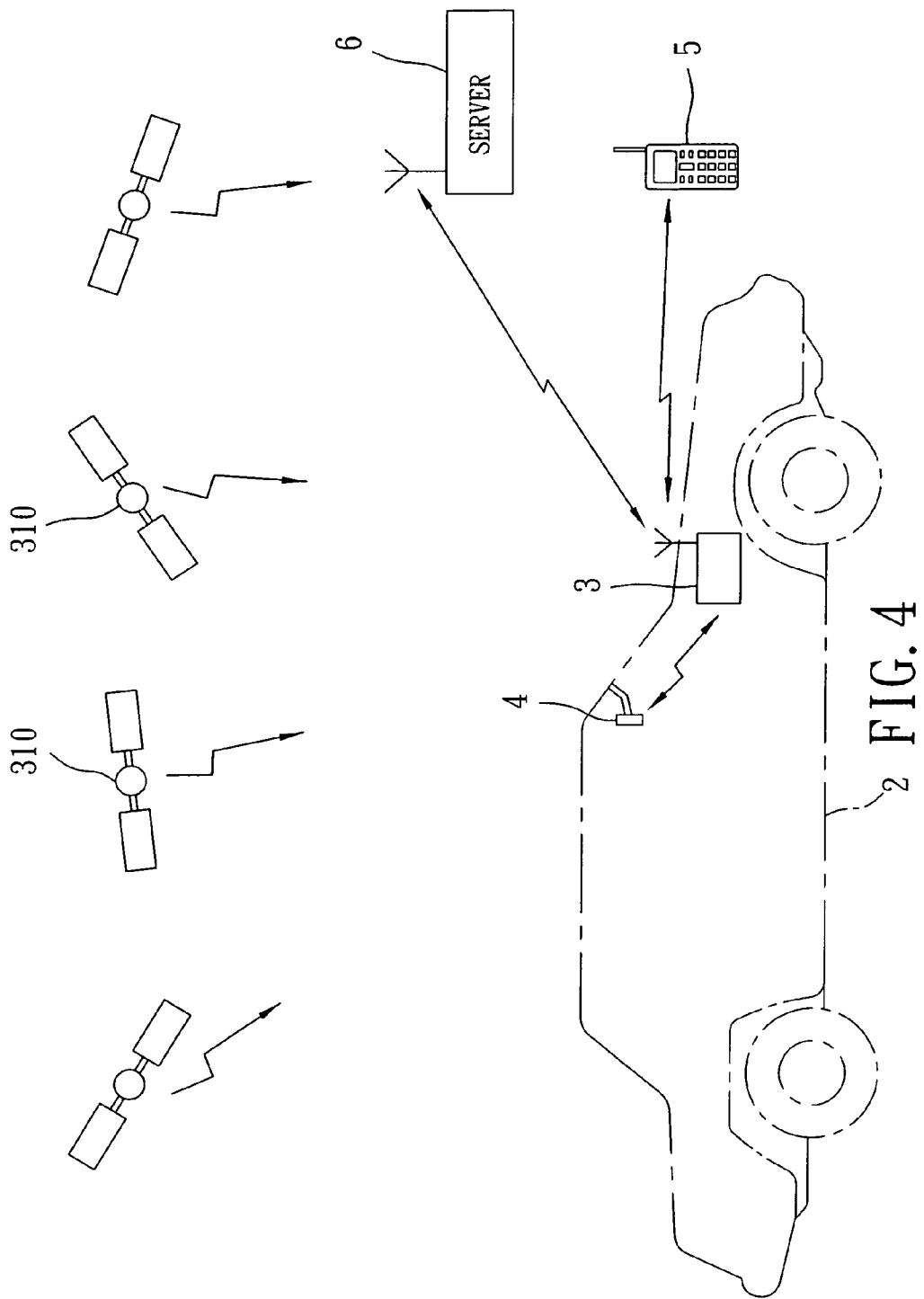
FIG. 4 is a schematic diagram of the second preferred embodiment of a positioning system for a movable object according to the present invention.
Figure 5:
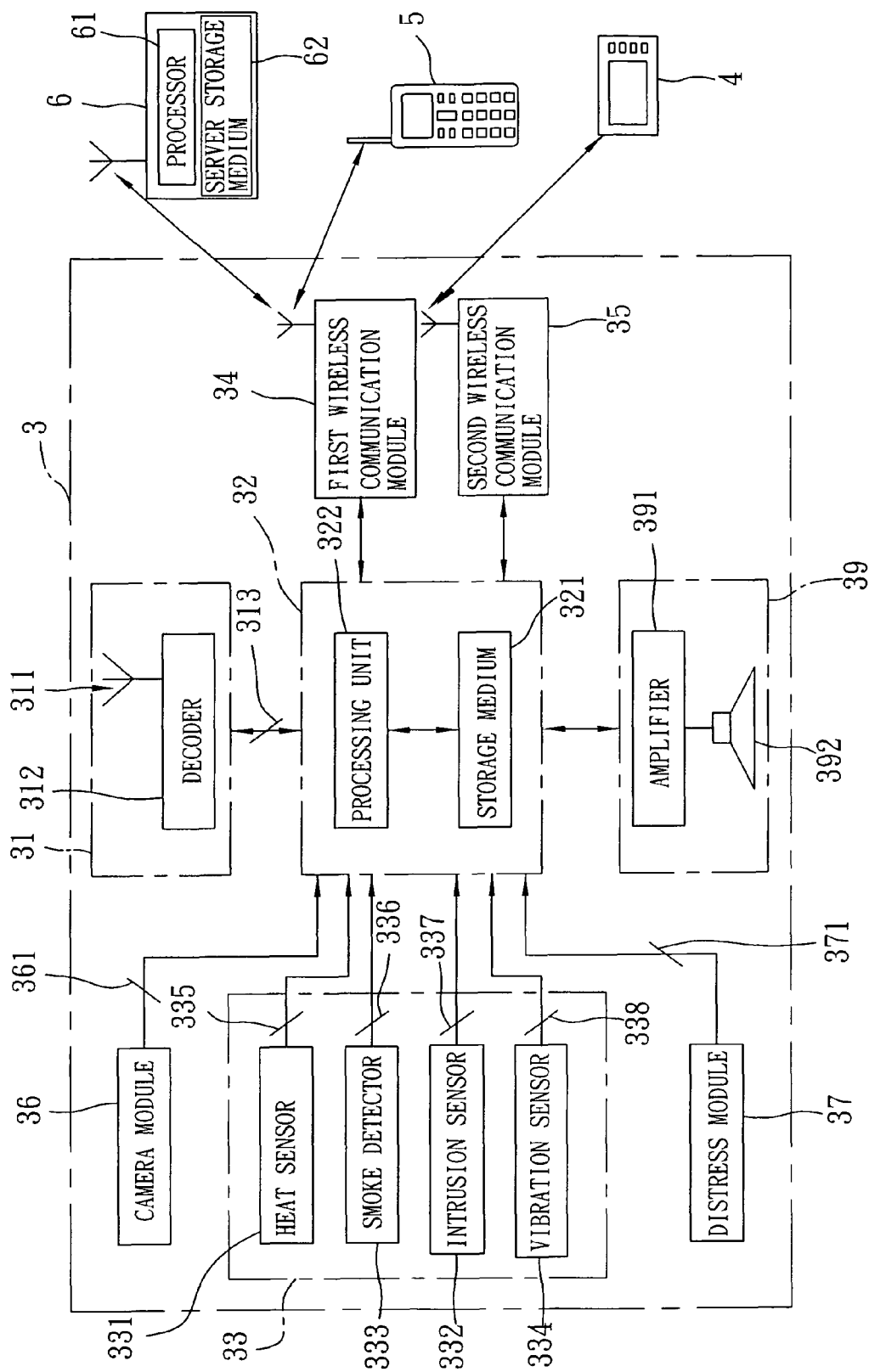
FIG. 5 is a block diagram to illustrate components of a positioning terminal and a server of the second preferred embodiment in greater detail.

FIGS. 4 and 5 illustrate the second preferred embodiment of the positioning system according to the present information, which differs from the first preferred embodiment in the following aspects. The storage medium 321 of the processing module 32 of the second preferred embodiment does not include the map database 323 (see FIG. 3). Instead, the positioning system of the second preferred embodiment further comprises a server 6. The server 6 includes a server storage medium 62 for storing the map data, and a processor 61 for generating the geographical information with reference to the positioning data 313 and the map data. In use, the processing unit 322 of the processing module 32 of the positioning terminal 3 is operable to transmit the positioning data 313 stored in the storage medium 321 to the server 6 via the first wireless communication module 34, and the processor 61 of the server 6 is operable to generate the geographical information by comparing the positioning data 313 transmitted by the processing module 32 with the map data stored in the server storage medium 62. The server 6 then transmits the geographical information to the processing module 32 via the first wireless communication module 34. The processing module 32 subsequently stores the geographical information received from the server 6 in the storage medium 321, and outputs the geographical information for subsequent transmission to the user terminal 5 via the first wireless communication module 34. Since the task of generating the geographical information is shifted to the server 6, the workload of the processing module 32 is considerably reduced, thereby reducing power consumption of the positioning terminal 3.

In this embodiment, since the server 6 is not used to provide information to the user terminal 5, there is no need to store private information associated with the user terminal 5 in the server 6.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A positioning system for a movable object, comprising a positioning terminal adapted to be disposed on the movable object, said positioning terminal including:
   a satellite-based positioning module adapted to receive satellite-transmitted signals and to generate positioning data from the satellite-transmitted signals;
   a detecting module adapted to detect status of the movable object, and operable to generate an alarm signal when said detecting module detects an abnormal status of the movable object;
   a processing module coupled to said satellite-based positioning module and said detecting module, said processing module including a storage medium for storing the positioning data from said satellite-based positioning module, and a processing unit for processing the positioning data stored in said storage medium and for outputting geographical information that contains geographical location of the movable object, said processing unit further outputting alarm information based on the alarm signal received from said detecting module; and
   a first wireless communication module coupled to said processing module, and operable to wirelessly transmit the geographical information and the alarm information from said processing module;
   wherein said first wireless communication module is further operable to receive a control signal that is provided to said processing module, said processing module selectively activating said satellite-based positioning module to update the positioning data and selectively enabling and disabling operation of said detecting module according to the control signal received thereby.

2. The positioning system as claimed in claim 1, further comprising a user terminal operable to establish a wireless connection with said first wireless communication module of said positioning terminal so as to receive the geographical information and the alarm information transmitted via said first wireless communication module, and further operable to send the control signal to said positioning terminal via the wireless connection established with said first wireless communication module.

3. The positioning system as claimed in claim 2, the movable object being a vehicle, wherein said positioning terminal further includes a camera module coupled to said processing module for capturing ambient images of the movable object and for generating corresponding image data provided to said processing module for storage in said storage medium of said processing module, said processing module being further operable to transmit the image data to said user terminal via said first wireless communication module.

4. The positioning system as claimed in claim 2, wherein said detecting module includes a heat sensor for sensing ambient temperature of the movable object, and the alarm signal is generated by said heat sensor when a temperature detected thereby is higher than a predetermined threshold.

5. The positioning system as claimed in claim 2, the movable object being a vehicle, wherein said detecting module includes an intrusion sensor that generates the alarm signal upon detection of unauthorized entry into the movable object.

6. The positioning system as claimed in claim 5, wherein said intrusion sensor is an infrared sensor.

7. The positioning system as claimed in claim 2, the movable object being a vehicle, wherein said detecting module includes a smoke detector that generates the alarm signal in response to detection of smoke in the movable object.

8. The positioning system as claimed in claim 2, the movable object being a vehicle, wherein said detecting module includes a vibration sensor that generates the alarm signal when the movable object is moved.

9. The positioning system as claimed in claim 2, the movable object being a vehicle, said positioning system further comprising a display terminal that is adapted to be disposed on the movable object, said positioning terminal further including a second wireless communication module coupled to said processing module and operable to establish a wireless connection with said display terminal, said processing module being operable to transmit the geographical information to said display terminal via said second wireless communication module, said display terminal displaying an image of the geographical location of the vehicle in response to the geographical information received from said positioning terminal.

10. The positioning system as claimed in claim 9, wherein said display terminal is a personal digital assistant.

11. The positioning system as claimed in claim 2, the movable object being a vehicle, wherein said storage medium of said processing module further stores emergency contact information, and said positioning terminal further includes a distress module coupled to said processing module and operable to generate a distress signal, said processing unit responding to the distress signal by transmitting the geographical information and distress information to a relevant party via said first wireless communication module according to the emergency contact information stored in said storage medium.

12. The positioning system as claimed in claim 2, the movable object being a vehicle, wherein said positioning terminal further includes a speaker module coupled to said processing module and operable to generate a voice output corresponding to the geographical information.

13. The positioning system as claimed in claim 2, wherein the geographical information and the alarm information transmitted to said user terminal by said first wireless communication module contain corresponding voice messages.

14. The positioning system as claimed in claim 1, wherein said storage medium of said processing module further stores map data, and said processing unit of said processing module outputs the geographical information with reference to the positioning data and the map data.

15. The positioning system as claimed in claim 2, further comprising a server that stores map data, said processing module of said positioning terminal being operable to transmit the positioning data stored in said storage medium to said server via said first wireless communication module, said server being operable to generate the geographical information with reference to the positioning data transmitted by said positioning terminal and the map data stored in said server, said server being further operable to transmit the geographical information to said processing module via said first wireless communication module, said processing module storing the geographical information received from said server in said storage medium and outputting the geographical information for subsequent transmission to said user terminal via said first wireless communication module.

16. The positioning system as claimed in claim 15, wherein said server includes a server storage medium for storing the map data, and a processor for generating the geographical information with reference to the positioning data and the map data.

* * * * *